United States Patent [19]
Bruno

[11] Patent Number: 6,104,156
[45] Date of Patent: Aug. 15, 2000

[54] DEVICE FOR CONTROLLING THE STOPPING OF A MOTORIZED SHROUDING PRODUCT

[75] Inventor: Serge Bruno, Marnaz, France

[73] Assignee: Somfy, Cluses, France

[21] Appl. No.: 09/328,135

[22] Filed: Jun. 8, 1999

[30] Foreign Application Priority Data

Jun. 16, 1998 [FR] France ................................. 98 07559

[51] Int. Cl.[7] ................................................ H02K 17/32
[52] U.S. Cl. ................................ 318/434; 49/26; 49/28; 361/33; 361/92; 318/466
[58] Field of Search .................... 318/434, 445, 318/447, 466, 282, 283, 286; 361/33, 92, 30, 86; 49/26, 28

[56] References Cited

U.S. PATENT DOCUMENTS

| | | | |
|---|---|---|---|
| 4,447,841 | 5/1984 | Kent | 361/18 |
| 4,855,653 | 8/1989 | Lemirande | 318/282 |
| 4,872,100 | 10/1989 | Diaz | 363/41 |
| 5,424,897 | 6/1995 | Mietus et al. | 361/91 |
| 5,808,411 | 9/1998 | Nehring | |
| 5,926,383 | 6/1999 | Pilukaitis et al. | 363/50 |

FOREIGN PATENT DOCUMENTS

| | | |
|---|---|---|
| 0716214A2 | 6/1996 | European Pat. Off. . |
| 2649260 | 1/1991 | France . |
| 2685829 | 3/1994 | France . |
| 2749714 | 12/1997 | France . |
| 4211495 C2 | 10/1994 | Germany . |
| 4312987A1 | 10/1994 | Germany . |
| 2168497 | 6/1986 | United Kingdom . |
| WO 97/21262 | 6/1997 | WIPO . |
| WO 9721262 | 6/1997 | WIPO . |

OTHER PUBLICATIONS

Preliminary Search Report in SN 9807559 —France.

*Primary Examiner*—Robert E. Nappi
*Assistant Examiner*—Rita Leykin
*Attorney, Agent, or Firm*—Bugnion S.A.; John Moetteli

[57] ABSTRACT

Device for controlling the stopping of a shrouding product driven by an asynchronous motor having a phase-shifting capacitor (1) stopping the motor when the shrouding product encounters an abutment or an obstacle and utilizing for this purpose at least one operating parameter of the motor so as to detect the appearance of a resisting overtorque. This device furthermore comprises means (4) for detecting a dip in the supply voltage of the local network and means for disabling the control of stoppage when the supply voltage falls below a specified value and for as long as this voltage remains below this specified value.

3 Claims, 2 Drawing Sheets

DEVICE FOR CONTROLLING THE STOPPING OF A MOTORIZED SHROUDING PRODUCT

BACKGROUND OF THE INVENTION

The subject of the invention is a device for controlling the stopping of a shrouding product driven by an asynchronous motor having a phase-shifting capacitor (1) stopping the motor when the shrouding product encounters an abutment or an obstacle and utilizing for this purpose at least one operating parameter of the motor so as to detect the appearance of a resisting overtorque.

Such a device is used in particular to control the stopping of the motor of a roller blind or shutter winding tube when the roller blind or shutter reaches an abutment in the fully wound up position. It may also serve to stop the descent of a roller blind or the closure of a door when this shrouding product encounters an obstacle in its closure motion or control the stopping of the motor when such a shrouding product reaches an abutment in the completely closed position.

Several devices functioning according to this principle are known. These devices are differentiated by the parameter measured and the manner in which it is measured and utilized. In the device according to patent DE 42 11 495, the content of which is incorporated by reference, the voltage across the terminals of the windings of the motor is measured. In patent GB 2 168 497, the content of which is incorporated by reference, the parameters measured are the principal current and the principal voltage. Patents FR 2 749 714, 2 649 260 and 2 685 289, the contents of which are incorporated by reference, disclose devices measuring the voltage across the terminals of the phase-shifting capacitor. The device described in patent EP 0 716 214, the content of which is incorporated by reference, uses the current in the principal winding and the current in the auxiliary winding of the motor as parameters. Finally, from patent DE 43 12 987, the content of which is incorporated by reference, it is known practice to measure the voltage across the terminals of the auxiliary winding of the motor.

All these devices show evidence of creativity and ingenuity as regards the means of detection, the accuracy of detection and compensation for the influence of the temperature of the motor, but they all have a major drawback in the case where detection must be both sensitive and reliable, especially in the case of doors or other compensated-weight shrouding products where the motor provides little torque, since this detection is perturbed and falsified by the voltage drops in the local network, these voltage drops modifying the value of the parameters measured. This perturbation results in unexpected stoppages, disturbances and learning errors due to confusing a drop in the measured parameter (due to the appearance of a resisting overtorque) and a drop in the value of the measured parameter (due to a drop in the voltage of the local network) due, for example, to a brief network overload (due, for example, to the starting up of a large electrical consumption device or to a natural phenomenon such as a thunderstorm). Such confusion may have disastrous consequences on a canvas. For example, if a strong wind blows up while a canvas is unfurled, an automatic controller for protecting against the wind detects and instructs the motorization to wind the canvas up fully. If this strong wind is accompanied by a thunderstorm and if the lightning should strike a distribution line, then there will inevitably be variations in the local network supply which might perturb the motor. If the detection device is sensitive, a quality which is required so as not to harm the shrouding product in the end-of-winding position, then there will very probably be an erroneous detection of end of winding and a stoppage of the motor while the canvas is still partially unfurled, which may have disastrous consequences.

In the case of a shutter or roller blind, the stopping of which in the fully unwound position is controlled by counting pulses starting from the wound-up position, a drop in the voltage in the local network may also have serious consequences when the point of stoppage in the fully wound up position is confused with a stoppage in an intermediate position due to this drop in the voltage of the supply. This is because the counting will take place starting from the position of intermediate stoppage as if it were the fully wound up position, so that the device for controlling the stoppage of the motor will want to continue the unwinding beyond the fully unwound position, and this could cause damage to the apparatus.

The purpose of the invention is to obviate these drawbacks.

SUMMARY OF THE INVENTION

The device according to the invention is one which furthermore comprises means for detecting a dip in the supply voltage of the local network and means for disabling the control of stoppage when the supply voltage falls below a specified value and for as long as this voltage remains below this specified value.

The philosophy of the invention therefore consists in anticipating an erroneous detection.

The detection means may be embodied either in an analog manner via an appropriate circuit, or in a digital manner by means of a logic processing unit equipped with a calculator.

BRIEF DESCRIPTION OF THE DRAWINGS

The appended drawing represents, by way of example, two modes of execution of the invention.

DETAILED DESCRIPTION OF THE PREFERRED EMBODIMENTS

Figure 1:
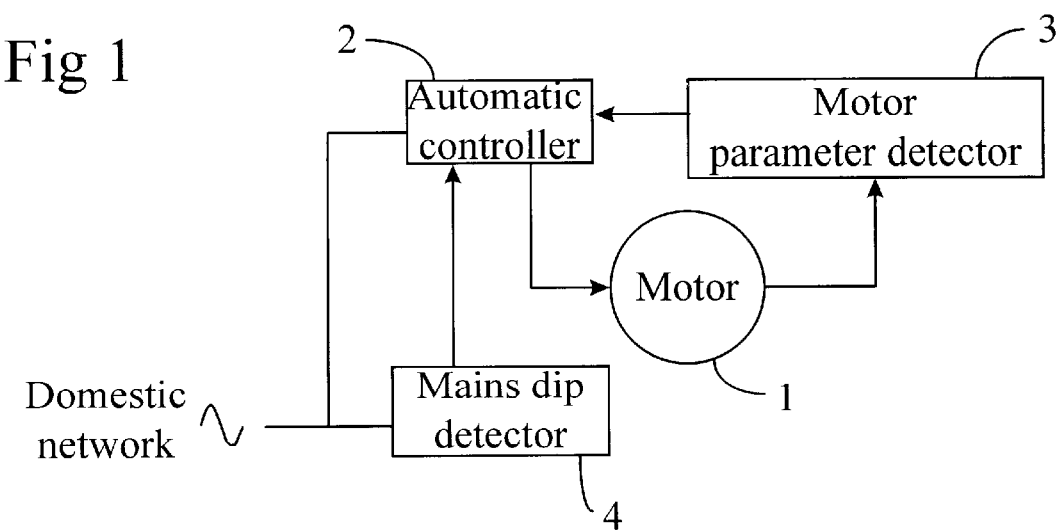
FIG. 1 is a block diagram illustrating the principle of the invention and valid for both modes of execution.

According to the schematic diagram of FIG. 1, a motor 1, driving a roller blind or shutter, is controlled by an automatic controller 2, for example, an automatic controller marketed under the reference SOMFY LINE 1000 controlling the unfurling and rewinding of the shutter as a function of exposure to sunshine and of wind, which automatic controller is supplied from the local network. The automatic controller 2 furthermore provides for the stopping of the motor as a function of a motor parameter detected by a detector 3 in such a way as to stop the motor when the shutter is completely wound up or if it encounters an obstacle. In accordance with the invention, the apparatus is supplemented with a mains dip detector 4 which disables the control of motor stoppage by the automatic controller 2 when the voltage in the local network falls below a chosen value and as long as this voltage remains below this chosen value.

The mains dip detector 4 can be embodied in an analog or digital manner. An example of an analog execution will be described in conjunction with FIGS. 2 to 4.

Figure 2:
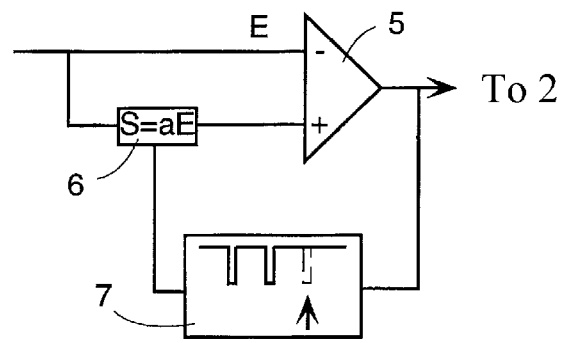
FIG. 2 represents the general diagram of an analog mode of execution.
Figure 3:
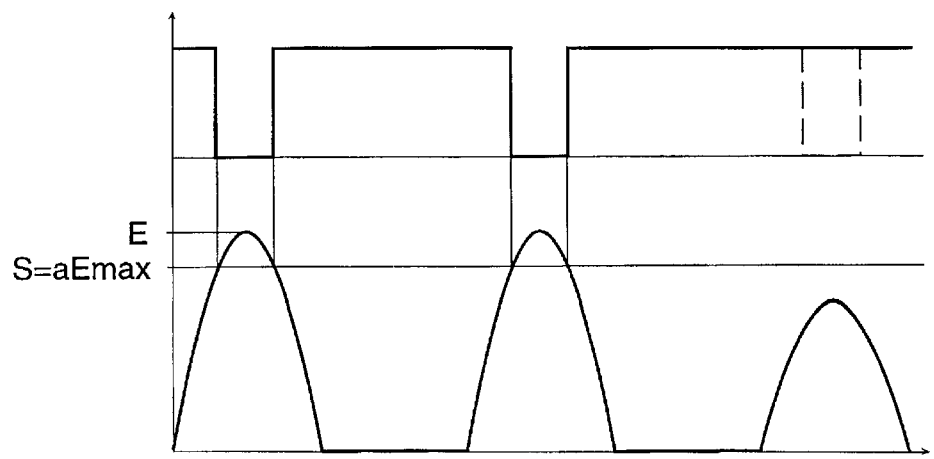
FIG. 3 is a graph illustrating the detection principle used in the mode of execution of FIG. 2.

According to FIG. 2, the mains dip detector comprises a comparator 5 which compares the inputs of which are applied, on the one hand, a voltage rectified in half-waves of a voltage proportional to the voltage in the network or mains, the peak value of the half-waves of which voltage is equal to E, and, on the other hand, a threshold DC voltage $S=\alpha E$, $\alpha$ being less than 1. These voltages are represented in the graphs of FIG. 3. As long as the amplitude of the half-waves E is greater than the threshold voltage S, the comparator 5 delivers zero-volt pulses at its output, as are represented in FIG. 3. If, on the other hand, the amplitude of the half-waves applied directly to the comparator 5 falls below the threshold S, no pulse appears at the output of the comparator. This absence of pulse is detected by a detector 7 which then sends a disabling signal to the automatic controller 2, this disabling lasting as long as no pulse appears at the output of the comparator 5. The link from the detector 7 to the circuit 6 is peculiar to the exemplary embodiment represented in FIG. 4.

Figure 4:
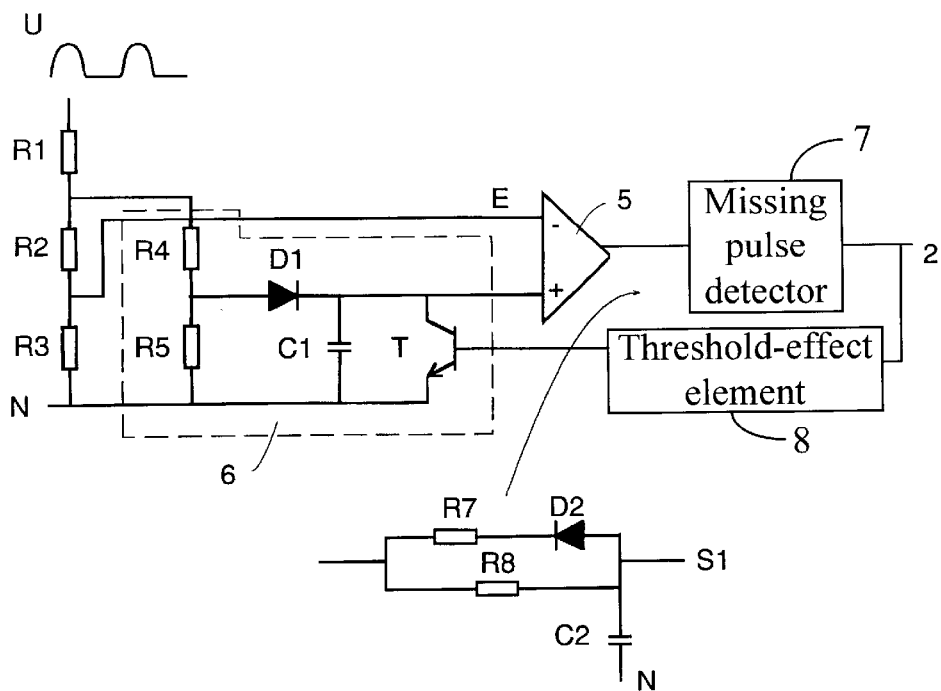
FIG. 4 represents an example of an electrical diagram which can be used for the embodying of this analog mode of execution.

In the circuit represented in FIG. 4, the half-wave rectified network voltage U is applied, via a resistor R1, to a first voltage divider R2/R3 delivering the voltage E and to a second voltage divider R4/R5 forming part of the circuit 6 for establishing the threshold, the second divided voltage being rectified by a conventional rectifier circuit consisting of a diode D1 and of a capacitor C1. The missing pulse detector 7 comprises a capacitor C2 mounted, like the capacitor of a rectifier circuit, on the one hand, together with a diode D2 and a resistor R7 and, on the other hand, together with a resistor R8 parallel to D2 and R7. The time constant of R8 and C2 is around 20 milliseconds, that is to say substantially equal to a period of the voltage of the network, whereas the time constant of R7 and C2 is much smaller than that of R8 and C2, i.e. around 1 millisecond. When the voltage of the local network is at its normal value and zero-volt pulses appear regularly at the output of the comparator 5, these pulses have the effect of discharging and keeping discharged the capacitor C2 across the resistor R8, the diode D2 being biased in the off direction so that no current passes through R7. As soon as a pulse is missing, the capacitor C2 continues to discharge across R8. The voltage rise at the output S1 of the circuit 7 is received as a disabling signal by the automatic controller 2. When a pulse appears again at the output of the comparator 5, the capacitor C2 discharges rapidly and the automatic controller is immediately ready to operate again. The circuit furthermore comprises a threshold-effect element 8 controlling the switching off of a transistor T mounted in parallel with the capacitor C1 of the circuit 6. This threshold-effect element 8 compares the voltage on the capacitor C2 with a reference voltage. When this voltage rises above the reference voltage, the threshold-effect element 8 switches off the transistor T across which the capacitor C1 can then partially discharge. The threshold voltage S momentarily falls below the voltage of the mains, thus again creating zero-volt pulses. The transistor T turns off again and the capacitor C1 can be recharged to the voltage determined by the voltage divider R4, R5.

Given that the device reacts immediately to a voltage drop, the fact that the voltage applied to the rectifier D1/C1 also drops is no impediment, given the inertia of the rectifier circuit. The threshold voltage S could of course be obtained in some other manner.

Figure 5:
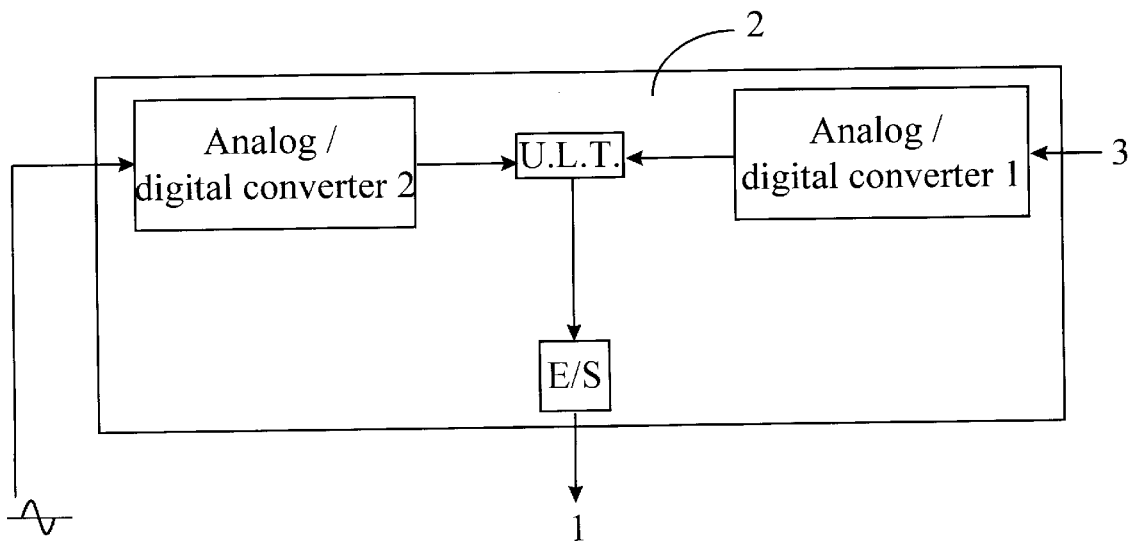
FIG. 5 represents the diagram of a digital mode of execution.

The digital execution represented in FIG. 5 amounts to adding a second analog/digital converter CAN 2 to the automatic controller 2, this converter receiving the voltage of the network or a proportional voltage. The logic processing unit ULT is programmed in such a way as to disable the control of motor stoppage when the state of the output of the converter CAN 2 corresponds to a network voltage drop below a chosen value. The analog/digital converter CAN I converts the motor parameter used for controlling the stopping of the motor by detection of an overtorque.

By virtue of a zero-volt detection, it is sufficient to read merely the maximum value of the sinusoids.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A device for controlling the stopping of a shrouding product driven by an asynchronous motor having a phase-shifting capacitor (1) stopping the motor when the shrouding product encounters an abutment or an obstacle and utilizing for this purpose at least one operating parameter of the motor so as to detect the appearance of a resisting overtorque, which device furthermore comprises means (4) for detecting a dip in the supply voltage of the local network and means for disabling the control of stoppage when the supply voltage falls below a specified value and for as long as this voltage remains below this specified value.

2. The device as claimed in claim 1, wherein the means for detecting a dip in the supply voltage comprises : a comparator (5) to which are applied, on the one hand, a half-wave rectified voltage proportional to the voltage of the local network and, on the other hand, a threshold DC voltage, this comparator delivering pulses so long as the half-waves applied to the comparator are greater than the threshold voltage, and a missing pulse detection circuit (7).

3. The device as claimed in claim 1, comprising a logic processing unit (ULT) and an analog/digital converter (CAN 1) for receiving the operating parameter of the motor, wherein the automatic controller (2) is equipped with a second analog/digital converter (CAN 2) to which is applied the voltage of the local network, the logic processing unit being programmed in such a way as to disable the motor stop command when the state of the output of the second analog/digital converter corresponds to a drop in the voltage of the network below the chosen value.

* * * * *